United States Patent [19]
Arndt et al.

[11] Patent Number: 5,802,378
[45] Date of Patent: Sep. 1, 1998

[54] PERFORMANCE MONITORING IN MULTIPROCESSOR SYSTEM WITH INTERRUPT MASKING

[75] Inventors: Richard Louis Arndt; Frank Eliot Levine; Edward John Silha; Edward Hugh Welbon, all of Austin, Tex.

[73] Assignee: International Business Machines Corporation, Armonk, N.Y.

[21] Appl. No.: 675,427

[22] Filed: Jun. 26, 1996

Related U.S. Application Data

[63] Continuation of Ser. No. 358,220, Dec. 16, 1994, abandoned.

[51] Int. Cl.⁶ ........................................... G06F 7/00
[52] U.S. Cl. ............................. 395/740; 395/183.13
[58] Field of Search ............................. 395/735, 736, 395/740, 185.2, 182.13, 182.19, 183.13

[56] References Cited

U.S. PATENT DOCUMENTS

| | | | |
|---|---|---|---|
| 4,068,304 | 1/1978 | Beausoliel et al. | 395/500 |
| 4,222,103 | 9/1980 | Chamberlin | 395/800 |
| 4,338,677 | 7/1982 | Morrill, Jr. et al. | 395/550 |
| 4,435,759 | 3/1984 | Baum et al. | 395/183.2 |
| 4,590,550 | 5/1986 | Eilert et al. | 395/183.21 |
| 4,746,920 | 5/1988 | Nellen et al. | 340/825.14 |
| 4,821,178 | 4/1989 | Levin et al. | 395/184.01 |
| 4,952,367 | 8/1990 | Porter et al. | 395/550 |
| 5,222,229 | 6/1993 | Fukuda et al. | 395/550 |
| 5,317,726 | 5/1994 | Horst | 395/575 |
| 5,317,734 | 5/1994 | Gupta | 395/650 |
| 5,317,752 | 5/1994 | Jewett et al. | 395/750 |

*Primary Examiner*—Ayaz R. Sheikh
*Assistant Examiner*—Paul R. Myers
*Attorney, Agent, or Firm*—Mark E. McBurney; Casimer K. Salys

[57] ABSTRACT

The present invention provides a system and method which ensures that machine state data, for each CPU in an MP system, corresponding to a specific point in time will always be saved, regardless of whether the system interrupt handler is enabled or disabled. A series of special purpose registers (SPR) are included, which are associated with the performance monitoring mechanism in each processor in the MP system. A time base mechanism in each CPU is used and synchronized across the entire MP system. When the time base mechanism requests that the machine state be recorded, the performance monitor then immediately stores the machine state values in the special purpose registers. Thus, the state of the each CPU in the MP system is saved at the identical point in time. The performance monitor issues an interrupt request to the interrupt handler and, if interrupts are enabled, the machine state data is stored for post-processing, or the like. However, if the interrupt handler has disabled interrupts, then the machine state data remains in the SPRs until interrupts are enabled and the data (corresponding to the same point in time) is then read from the special purpose registers into memory, or the like, for post-processing.

13 Claims, 4 Drawing Sheets

PERFORMANCE MONITORING IN MULTIPROCESSOR SYSTEM WITH INTERRUPT MASKING

This is a continuation of application Ser. No. 08/358,220 filed Dec. 16, 1994 now abandoned.

BACKGROUND OF THE INVENTION

1. Field of the Invention

The present invention generally relates to performance monitoring in multiprocessor computer systems. More specifically, a performance monitor in each of the processors in the MP system captures data at precisely the same time period. The data captured is independent of whether the interrupt handling system in the processor unit is enabled or disabled.

2. Description of Related Art

To examine and tune the performance of an MP system, it is desirable to obtain a sequence of samples of the current instruction and data addresses simultaneously in execution across all system processors. Data sampling and profiling have proven to be invaluable tools for performance tuning uniprocessor systems. To provide the key aspects of profiling for tuning symmetrical multiprocessor (MP) systems comprised of PowerPC processors, it is necessary to find a way to inexpensively capture the individual states of multiple processors simultaneously. Machine state refers to at least, the current instruction address in execution along with the operand address (if any) associated with the current instruction. Since the performance of an MP system is strongly coupled to interaction among the processors of the MP, it is crucial that the states of the processors in an MP system be captured simultaneously since to do otherwise would sacrifice the knowledge of the interactions between the processors of the MP system.

It is important to be able to detect conditions such as several processors simultaneously spinning on a lock or in a software wait state or other similar software resource contentions. Simultaneous processor state samples can be thought of as an accurate "cross-sectional view" of the threads of execution.

Additionally, the method must be such that the delay between samples must be tunable to allow the system state to progress to the point requiring monitoring and/or to avoid the interference of the sampling processing.

Central processing units may include a performance monitoring mechanism for sampling address and operand information to determine the state of the machine at a specific point in time. To accomplish this, a periodic interrupt is signaled to the system interrupt handling mechanism which requests that the machine state data be read and stored to memory, or the like, for postprocessing. The execution profile then consists of a record of many sequential instances of the saved state data points. However, it is not uncommon for the interrupt handling mechanism to be in an interrupt masking state. The interrupt handling mechanism is essentially a processing element that includes a software service routine running in conjunction with a processor execution unit. For various reasons, the interrupt handler may not be servicing interrupt request signals. When this occurs, it is likely that the state values required by a performance monitoring mechanism will change prior to the interrupt handler enabling interrupt requests and reading the machine state data.

In a uniprocessor system, the machine state is recorded at a different points in time, and since there are no additional processors the machine state data may be valid, provided that there is no biasing action of the hardware. However, this is rarely the case. In superscalar designs there are typically many instructions in progress at any point in time. When an interrupting condition is detected, the processor has to decide which of the currently executing instructions (if any) must be cancelled to allow execution of the interrupt processing software. There are many approaches to deciding where to break the execution stream, typically, the stream will be broken in a way that is not random. In particular, many processor designs choose to break the execution stream at branch instructions. The consequence is that even for uniprocessors, a profile has underlying biases. Biasing occurs when non-random samples are taken at points in the instruction execution process where similar conditions exist. Even processing units with interrupts enabled will inherently allow execution of interrupts only at particular points in time, when instructions that are currently executing are completed (it is not always acceptable for an interrupt to be processed prior to executing the next instruction). Typically, this occurs it a branch target. Thus, in prior art systems where the machine state data is stored only when the processor executes interrupts the state data will give results that are biased towards certain machine conditions that are present when the processor allows interrupts to be serviced. Thus, it can be seen that it would be advantageous to have a system that could randomly save machine state data, independent of whether the processor has determined that it is convenient for interrupts to be handled. Adding additional processors as in a multiprocessor system only complicates matters. Thus a need exists for a system that will eliminate these biases and hence provide an unbiased sampling of the execution streams.

But, in an MP system the machine state data must be recorded for each CPU at an identical point in time. Otherwise, the problem arises wherein a first processor may have interrupts enabled while a second processor has interrupts disabled. Therefore, the interrupt handler in the first processor will record the state of the first CPU at a first point in time. Further, the state of the second processor may change to reflect a second point in time (after the first point in time) while waiting for the interrupt handling system to enable interrupt requests. This causes a serious problem in MP systems, because the data recorded for the first and second CPUs will not be consistent at a specific point in time. Many interdependencies exist between the processors in a multiprocessor system. To obtain any meaningful profile, or sample data in a MP system, the state of each CPU in the system must be recorded for the same point in time.

Therefore, it can be seen that a system and method is needed that will ensure that the machine state of each CPU in a MP system is recorded at the same point in time.

SUMMARY OF THE INVENTION

In contrast to the prior art, the present invention provides a system and method which ensures that data corresponding to a specific point in time will always be saved, regardless of whether the system interrupt handler is enabled or disabled.

Broadly, the present invention includes a series of special purpose registers (SPR) associated with the performance monitoring mechanism in each processor in the MP system. A time base mechanism is included in each CPU and synchronized across the entire MP system. When the time base mechanism requests that the machine state be recorded, the performance monitoring mechanism then immediately stores the machine state values in the special purpose registers. Thus, the state of each CPU in the MP system is saved at the identical point in time. The performance monitoring mechanism of each CPU in the system issues an interrupt request to the interrupt handler and, if interrupts are enabled, the machine state data is stored by interrupt processing software for postprocessing, or the like. However, if the interrupt handler has disabled interrupts, then the machine state data remains in the SPRs until interrupts are enabled and the data is then read from the special purpose registers into memory, or the like, for subsequent postprocessing. In this manner, consistent, synchronized machine state data for each CPU is recorded at each point in time as requested by the time base.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
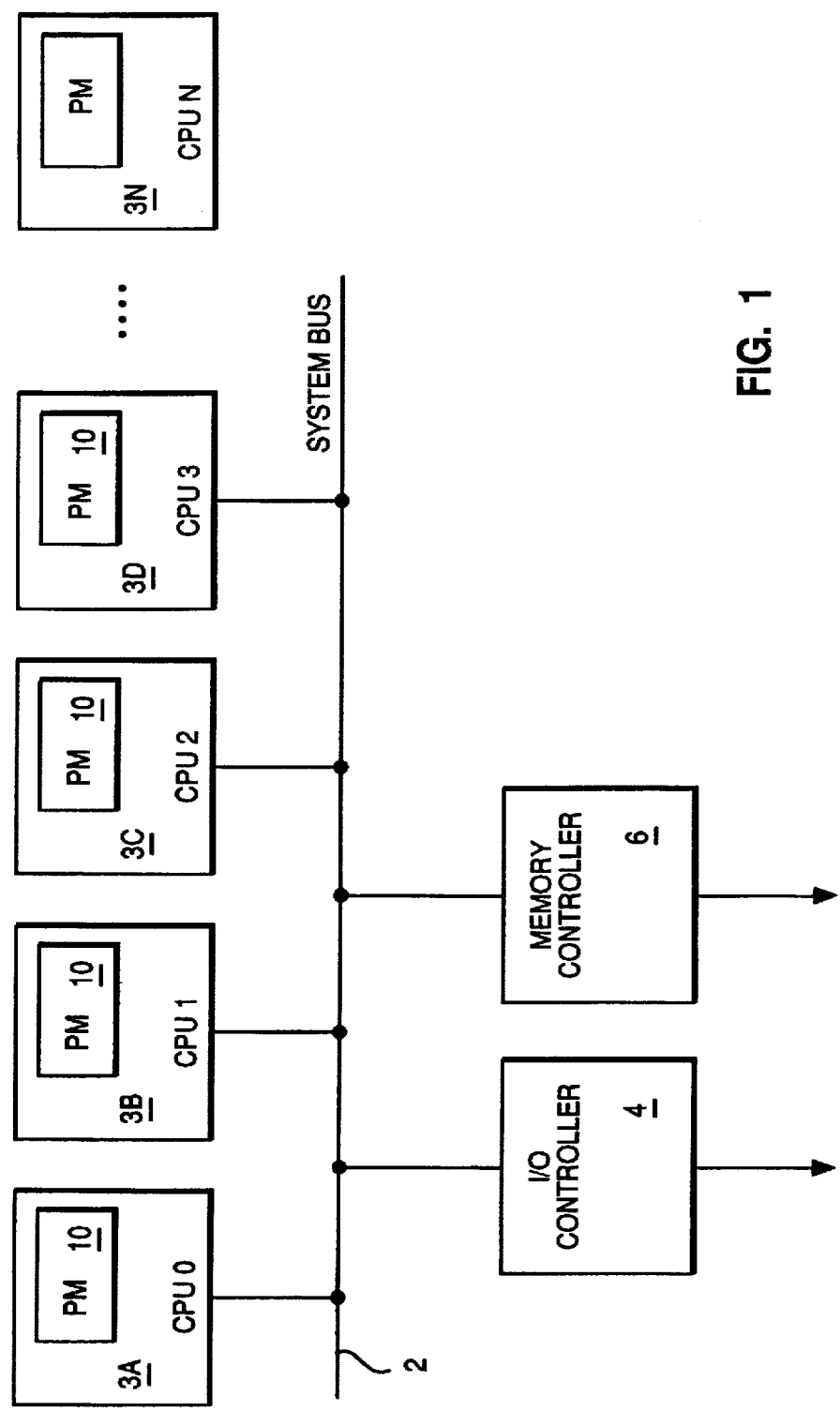
FIG. 1 is a block diagram showing a multiprocessing system of a type which may implement the present invention.

Referring to FIG. 1, a block diagram of a multiprocessing system capable of implementing the present invention is generally referred to by number 1. CPUs 3A (CPU0), 3B (CPU1), 3C (CPU2), 3D (CPU3) through 3N (CPUN) are shown. It should be noted that in a preferred embodiment, each of these processors are substantially identical, therefore, the present invention will be described in conjunction with processor CPU0 3A. However, it should be understood that this description will apply equally as well to each of the other processors 3B through 3N. A system bus 2 is included which provides address and data transfer communication between each of the processors 3A through 3N. Further, input/output (I/O) controller 4 and memory controller/subsystem 6 are each connected to system bus 2 such that data and address information can be transmitted between the processors and I/O controller 4 and memory device 6. In this manner, the processors 3A through 3N can store information to memory by writing it to memory controller system 6 (which includes memory storage devices, such as dynamic random access memory (DRAM) and/or static random access memory (SRAM) devices, or the like), via bus 2. Additionally, information can also be read from memory controller 6 and stored to CPUs 3A through 3N, also via bus 2. Similarly, information can be transferred between processors 3A through 3N and I/O controller 4 such that communication can be made to other processing systems and/or devices.

Figure 2:
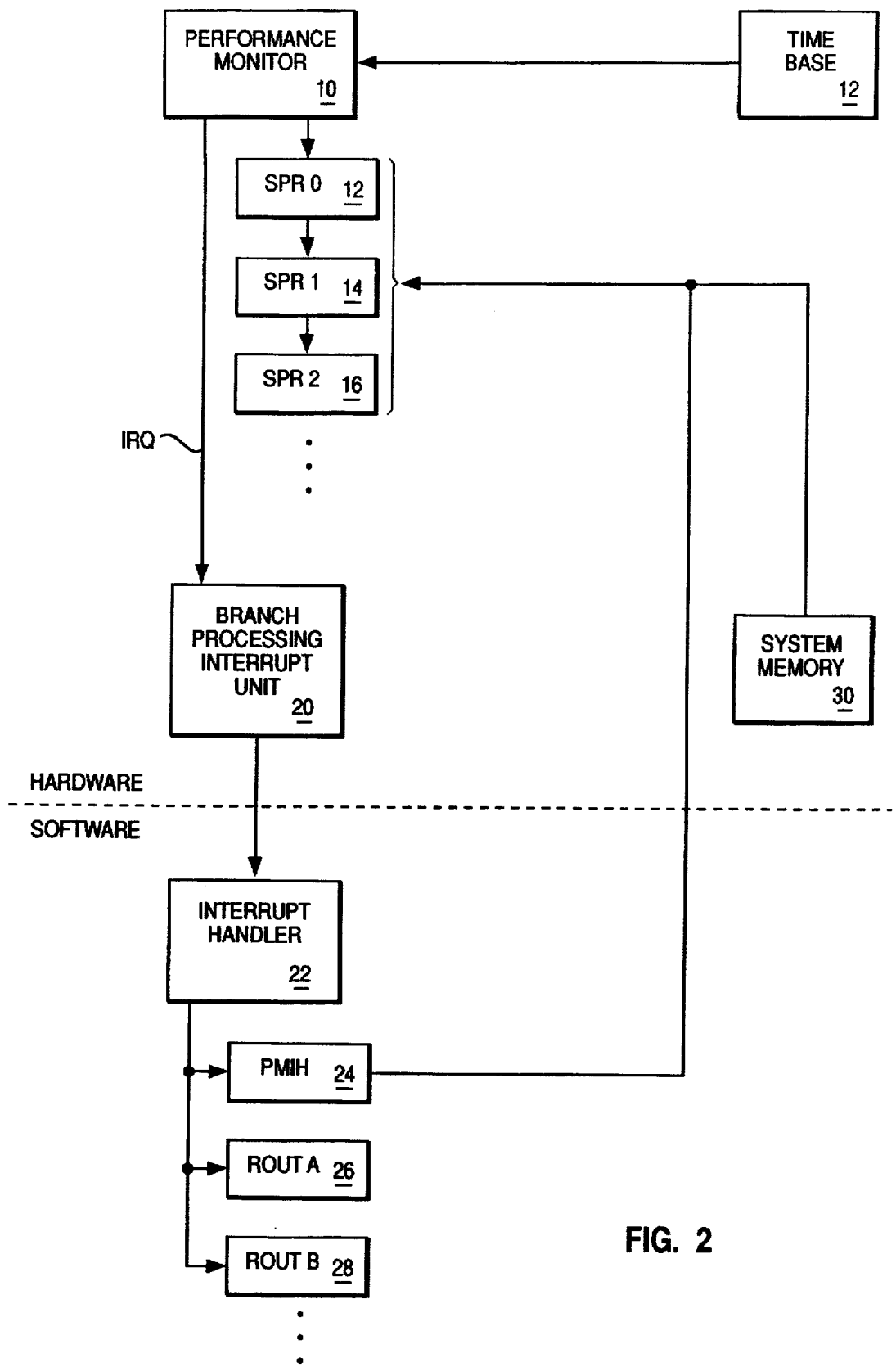
FIG. 2 is a more detailed view of the performance monitoring aspect and interrupt handling aspects of the present invention.

In a preferred embodiment, each of the CPUs 3A through 3N will be a PowerPC microprocessor, commercially available from IBM Corporation (PowerPC is a trademark of IBM Corporation). Each of these microprocessors will include a performance monitor facility 10 which is used to obtain profile data for its corresponding machine. Referring to FIG. 2, it can be seen that performance monitor 10 is provided in conjunction with a time base facility 12 which includes a counter that designates the precise point in time when the machine state is to be saved. Each of the CPUs 3A through 3N includes a time base facility 12 with a clock having a frequency that is based upon the system bus clock. A time base facility is required on each processor in an MP system. This is due to the fact that an MP system needs a synchronized time base i.e. a time base for each processor with all time bases in synchronization). The time base clock frequency is either equal to the system bus clock, or a ratio of it, e.g. ¼ of the bus clock frequency, or the like. In one embodiment, the time base clock is one-sixth the speed of the system bus clock, i.e. one time base clock cycle occurs for every six system bus clock cycles. A 64 bit counter is included in time base 12 wherein predetermined ones of the bits are flipped such that the increment of time between bit flips can be controlled.

It should be noted that the time base mechanism is capable of sampling machine state data based on substantially any type of recurring system event. For example state data could be captured each time a level 1 (L1) or level 2 (L2) cache miss, a lateral cache hit, or the like occurs. Although, the preferred embodiment is described using a counter based on a certain ratio with the system clock, any number of system events could be chosen as the time reference for when machine state data is sampled.

In a multiprocessor system it is important that each time base facility 12 in each CPU 3A through 3N is initialized at precisely the same time. This synchronization can be accomplished by basically resetting the multiprocessor system. More particularly, the MP system is stopped and then initialized by setting each of the time base facilities 12 in each of the CPUs to the same value, e.g. 0, and then starting/restarting the multiprocessor system. Thus, each of the time base facilities 12 are synchronized to the system bus clock, and the counters therein are initialized to the same value. In this manner, each of the time base facilities will send a notification signal to performance monitor 10, requiring that the machine state be stored, to its respective performance monitor 10 at exactly the same time.

Figure 4:
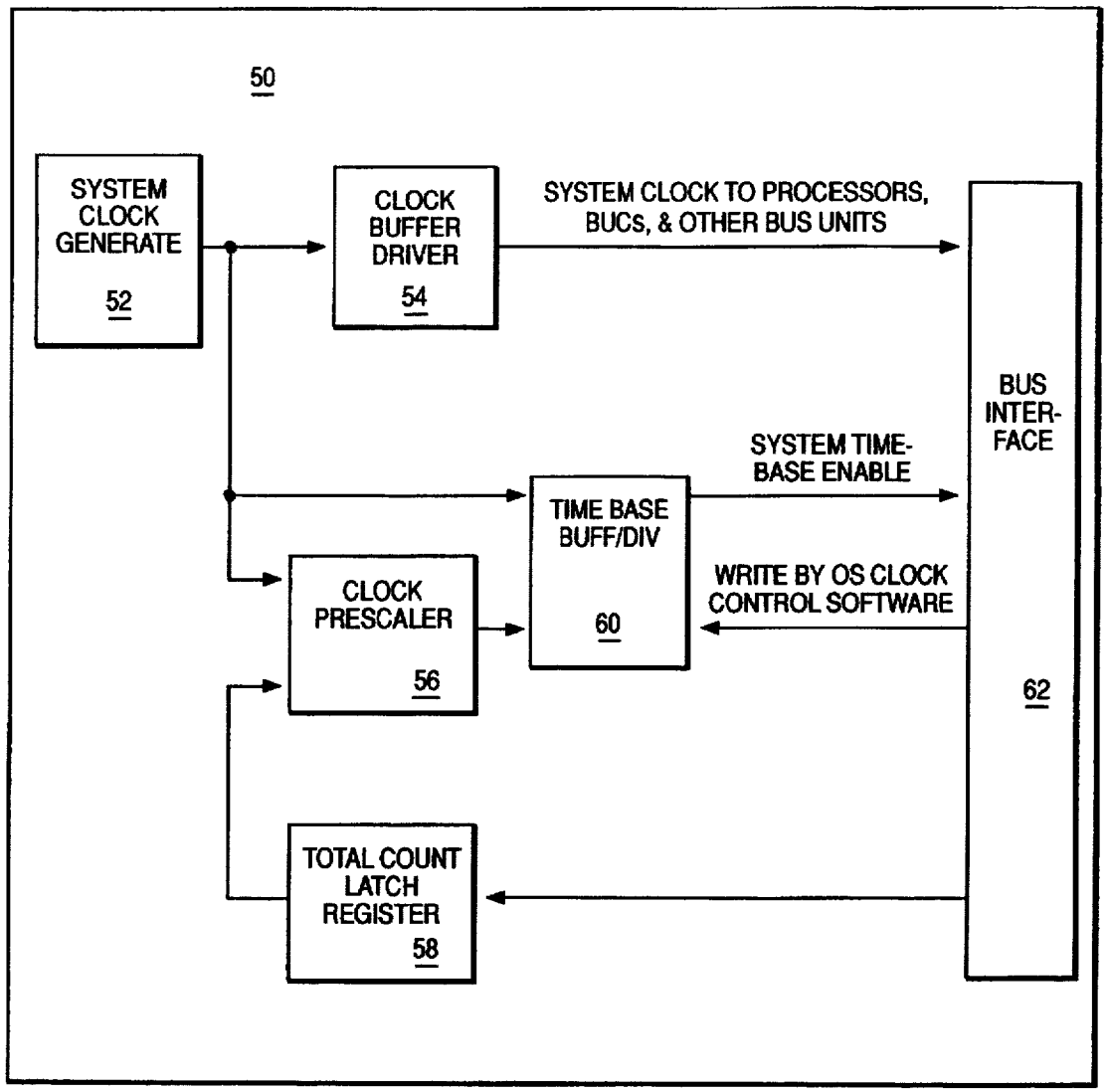
FIG. 4 is a block diagram showing one preferred embodiment of synchronizing each of the processors in the multiprocessor system.

FIG. 4 illustrates another preferred method of synchronizing the time base facilities 12 in CPUs 3A through 3N is shown. Reference number 50 generally represents the system time base generation and synchronization mechanism which may be used by the present invention to synchronize the time base in each processor. The system clock 52 generates the signal which control system bus 2 and outputs this clock signal to clock buffer driver 54, clock pre-scaler 56 and time base buffer 60. Clock driver buffer 54 outputs the system clock signal, via bus interface 62 to the processors, bus unit controller and other devices requiring this signal. A count latch register 58 is also provided which, along with the time base buffer/divider 60 receives a programmed clock control signal from the operating system software (not shown). The count latch register 58 then provides the operating system control signal to clock pre-scaler 56, which outputs a synchronization control signal to time base buffer 60, which in turn, outputs the time base system enable signal to time base facilities 12, via bus interface 62.

Clock pre-scaler 56 is a 15-bit programmable (by operating system software) circuit that deletes one clock pulse enable each time it reaches total count. Using this method, the system of FIG. 4 will provide the following characteristics:

1. base total count (0.95 * 32768) ... 31129
2. maximum range of adjustment ... # 5%
3. adjustment granularity ... 116 msec/hr
4. maximum skew rate (time adjustment) ... # 190 sec/hr
5. zero count ... clocks stopped The pre-scaler 56 could be designed to have a longer period in order to increase precision or a shorter period, which would reduce cost. An optional programmable divider (shown in time base buffer 60) could also be provided to supply a time base signal that is in the range of 3 to 12 percent of the system clock frequency. Processors 3A through 3N would then count system clocks when the time base enable signal was asserted allowing the time base to be relatively independent of the system clock frequency.

The time base synchronizing clock of FIG. 4 can be adjusted without explicitly loading a new value into the time base register 58. This avoids the problem of multiple updates to adjust for a large error. The pre-scaler circuit 56 would be adjusted to compensate for the error over some period of time, such as the point at which the next clock synchronization computation to synchronize the time base with the network occurs. If the clock is fast, software reduces the time base enable rate rather than attempting to set the time back in a series of small changes required to avoid the appearance of time running backward.

In an MP system, one processor 3A through 3N can perform the clock synchronization protocol with the network and then make a single adjustment to adjust the clocks of all processors. The only time a rendezvous of all processors is necessary is at power-on reset time. At the power-on reset rendezvous, the clocks are turned off (count set to zero), all processors initialize their clocks and then the lead processor sets the pre-scaler to a default or calibrated value, starting all the clocks.

This scheme also simplifies the software used to initialize, synchronize, and correct the clock. Clock drift can be reduced, providing a more precise time standard using standard precision crystals. Only the stability of the crystal and the precision of the synchronization software limit the precision of the clock (independent of the precision of the crystal).

Associated with the System Time Base control is the Time Base Buffer/Divider Register 60. In a PowerPC microprocessor, this register will be located in architected system memory space at a high memory location.

Also associated with the System Time Base control is the total count latch register 58. This register will be located in architected system memory space at another high memory location.

Referring again to FIG. 2, the present invention allows all the processors of a given MP system to detect and count an event that occurs synchronously on all the CPUs in the system. A preferred method of tracking these events is time base facility 12, which is present in PowerPC microprocessors. Processors which include some type of facility for maintaining state information at specific points in time are known, and the PowerPC microprocessor is described herein by way of example and not limitation. Each time base 12 can be synchronized among all the processors of an MP system, using methods described above.

Since time base 12 is synchronized across all the processors in a given MP system, it provides a simple mechanism for synchronizing the processors, thus allowing all the processors of the MP to detect and react to a single system wide event in a synchronous manner. A transition of one of a selected group of bits of the time base register was chosen as the means to detect the same condition among the multiple processors 3A through 3N simultaneously. In a general solution to the problem, the transition of any bit can be chosen for counting. However for the processors that support this synchronous interrupt capability, it is expected that only one of four (4) bits of the 64 bit time base counter maybe selected via the software accessible Monitor Mode Control Register (MMCR).

In a representative embodiment four (4) time base bits (based on a 66 Mhz Bus clock) could be chosen: bit 46-0.98 msec, bit 45-1.96 msec, 43-7.84 msec, and bit 39-125.44 msec. While it is necessary that all processors detect and signal this synchronous time base interrupt condition simultaneously, it is not necessarily possible for all processors to process this interrupt event simultaneously (one reason is that the interrupts for some of the processors may be disabled at the time the event occurs). That is, the act of saving the state information including address and operand data, an architectural consequence of invoking interrupt handling software, may therefore be delayed by the disablement of the processors. To ensure that there is no loss of data due to interrupt masking, when the interrupt condition is detected, the processors will capture the effective instruction and operand (if any) addresses of "an" instruction in execution and present an interrupt to the interrupt resolution logic. These addresses are to be saved in two registers Saved Data Address (SDA) and Saved Instruction Address (SIA) designated for this purpose at the time of the system wide signaling. When the interrupt is actually serviced, the content of the SDA and SIA will reflect the CPU state at the time of the system wide signalling.

In FIG. 2, a notification signal is sent from time base 12 to performance monitor 10 when a predetermined bit in the counters of each of the synchronized time base facilities 12 is flipped. This notification signal causes the performance monitor to save the machine state values in special purpose registers 12, 14 and 16. FIG. 2 shows three (3) SPRs 12, 14 and 16 for discussion purposes, however, it should be understood that the present invention contemplates using any number of registers to store the state data.

Performance monitor 10, is a software accessible mechanism intended to provide detailed information concerning the utilization of processor instruction execution and storage control. The monitor consists of an implementation dependent number of 32-bit counters which are used to count processor/storage performance related events. The PowerPC microprocessors which support performance monitoring provide an implementation dependent number of events that can be selected for counting.

The Monitor Mode Control Register (MMCR0) establishes the function of the counters. The counters and the MMCR0 physically reside .on the processor chip and are addressable for read or write via mfspr or mtspr instructions. Writing to these SPRs is only allowed in privileged, or supervisor, state. Reading from these SPRs may also be allowed in the problem state. Reading these counters/registers does not change their content.

The Monitor Mode Control Register (MMCR0) is partitioned into bit fields that allow for selection of events (signals) to be recorded (counted). Selection of allowable combinations of events, causes the counters to operate concurrently. The MMCR0 includes controls, such as, counter enable control, counter overflow interrupt control, counter event selection, and counter freeze control.

The performance monitoring facility 10 uses a "performance monitor" interrupt which is signalled by a negative counter (bit zero "on" or "one") condition. The performance monitor interrupt will be used by profiling software to sample the code stream to find "hot spots", i.e. code which is used repetitively and can be combined or tuned to increase overall performance.

When the performance monitor 10 receives the notification from time base 12 to "sample data", an interrupt signal is then output to a branch interrupt processing unit 20. Concurrently, the sample data (machine state data) is placed in special purpose registers 12, 14 and 16 designated for this purpose. In a preferred embodiment two additional SPRs are included to allow access to this sampled data: the SIA, or the Saved Instruction Address, and the SDA, the Saved Data Address. At the time the interrupt is taken, the captured operand address (if any) should be in the SDA, the captured instruction address should be in the SIA, and, in a PowerPC 604 microprocessor implementation (PowerPC 604 is a trademark of IBM Corp.) additional machine state information will be in SRR1 bits (1–4 and 10–15).

To avoid using a counter, a flag is included that will indicate the signalling of an interrupt on the chosen bit transition as defined in the MMCRO. When this flag is set to signal an interrupt on the transition of the chosen bit, all the processors set to signal an interrupt on that bit transition shall simultaneously signal a performance monitoring interrupt. The actual implementation of the time base and the bits to choose for performance monitoring counting is a function of the system and the processor implementation, respectively.

Once performance monitor 10 receives the notification signal from time base 12, the monitor samples the machine state data stored therein by reading the data from certain registers in the performance monitor and then storing this state data in special purpose registers 12, 14 and 16, and the like. It should be noted that performance monitor 10 normally operates in a uniprocessor system and includes all of the state information needed by the present invention. In uniprocessor systems, there is no need to maintain the state data separate from the performance monitor, because it is not necessary to maintain consistency between the subject processor and other CPU(s). Once the state data is stored in SPRs 12, 14 and 16, performance monitor 10 then issues an interrupt request signal to branch interrupt processing unit 20.

However, the present invention has utility in uniprocessor systems since the machine state data can be sampled at any point in time, regardless of whether interrupts are masked, or not. A performance monitor in a conventional uniprocessor system is unable to capture machine state data at a specific point in time, if interrupts are disabled at that time. That is, a performance monitor could not obtain state data at time A if interrupts were disabled this time. Thus, the machine state would be captured at some point in time after time A (e.g., A+N). Therefore, conventional systems cannot determine whether the processor is running optimally during the time when interrupts are disabled, because machine state data can never be captured at these particular points in time. However, by utilizing the present invention the machine state data can be captured at any point in time (not only when interrupts are enabled), since the data is saved to SPRs 12, 14 and 16. The state data for the processor, during the time period when interrupts are disabled, can then be used to optimize processor performance by determining if any "hot spots" exist in the code being run at that time. Further, the present invention can be used to ensure that random machine state information is obtained and eliminate bias and to provide a random sampling of data. In this manner, the present invention has particular utility for uniprocessor systems, as well as multiprocessor systems, since state data can be obtained for time periods when interrupts are disabled.

Most superscaler processing units include a branch interrupt processing unit (BPU) which is used to predict and eventually determine an instruction path, based upon dependencies in the instructions themselves and other system parameters. This BPU 20 is capable of receiving interrupt signals and then when appropriate conditions have been met, divert execution to the operating system interrupt handler 22, based on an interrupt request (IRQ) from performance monitor 10. However, in some cases, BPU 20 may be engaged in other processing activities that cannot be interrupted. In this instance, interrupts are masked (disabled). However, when interrupts are not masked (enabled), BPU 20 sends the IRQ to interrupt handler 22 which then invokes at least one service routine 24, 26, 28. FIG. 2 shows the case where performance monitor interrupt handler (PMIH) routine 24 is invoked upon receipt of a performance monitor IRQ from BPU 20. Routine 24 is then initialized in the system software and reads the sample data stored in special purpose registers 12, 14, 16, or the like. This machine state sample data is then stored in system memory 30, such as on a hard file, tape, floppy disk, or the like. It should be noted that system memory 30 refers to memory included in the multiprocessor system 1, such that state data for each of CPUs 3A through 3N, at the identical point in time, will be stored.

It can be seen that the inclusion of special purpose registers 12, 14, 16 or the like give the present invention a distinct advantage over conventional systems which merely store the state information in registers in performance monitor 10. That is, if BPU 20 in one of the CPUs in the MP system has disabled interrupts, then it is likely that the sample data in performance monitor 10 will change before interrupt handler 22 and service routine 24 can retrieve the data and store it for post-processing. This would cause at least one CPU in the MP system to record data that is inconsistent with the other CPUs, since the machine changed state before the sample data could be recorded to memory. However, the present invention saves machine state data in the SPRs 12, 14, 16 at a specific point in time which corresponds to the same time that data is saved in all other CPUs in the MP system. Thus, consistent state data for each CPU in the MP system can be read from the SPRs at the exact time desired, since it is maintained in the registers a sufficient length of time to allow IH 22 and routine 24 to retrieve the data, independent of whether BPU 20 had masked interrupts when the signal was received from performance monitor 10.

Figure 3:
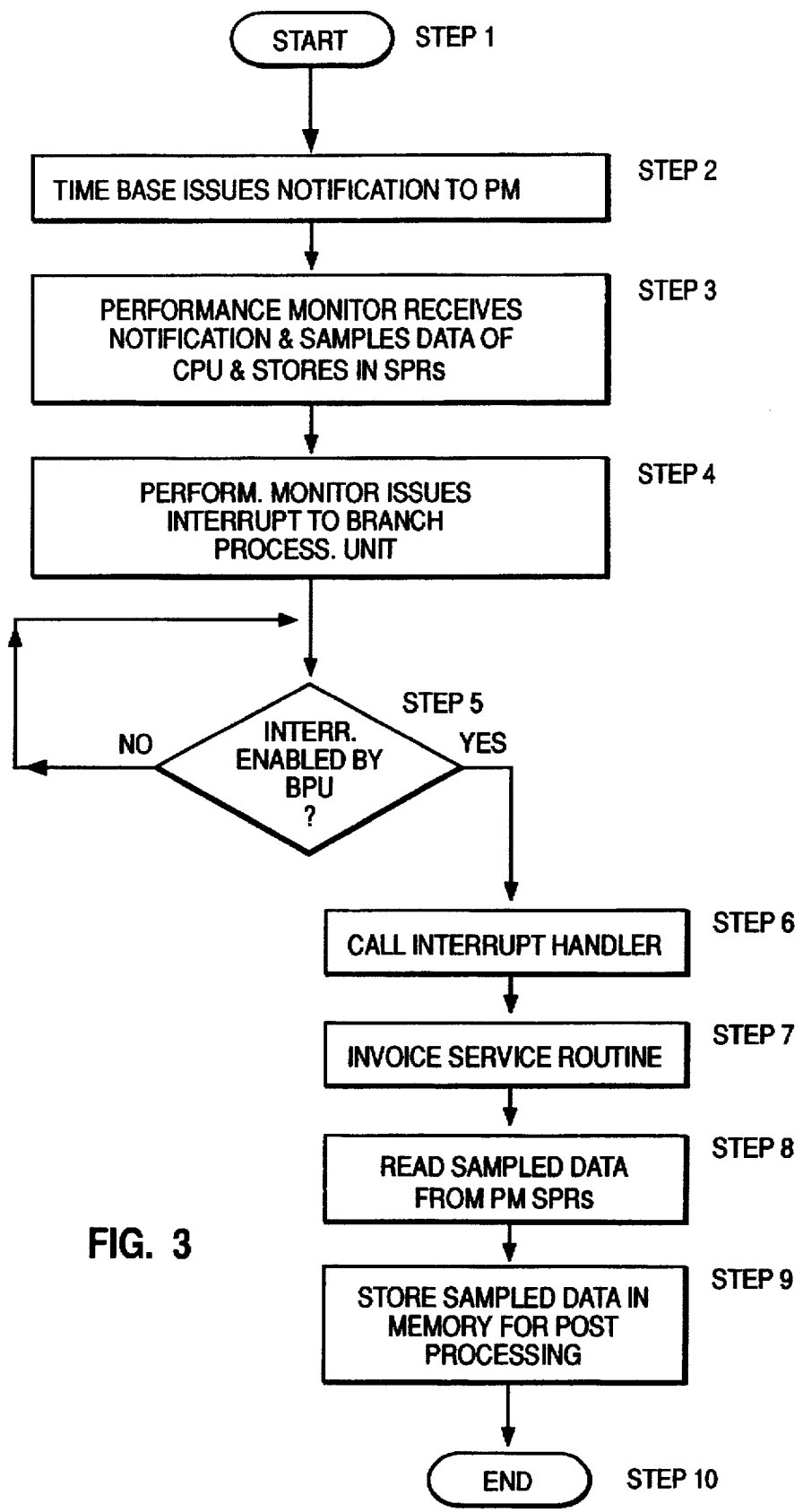
FIG. 3 is a flow chart illustrating the sequence of operations the present invention may implement.

The process implemented by the present invention to ensure consistent state data is obtained for all CPUs in a MP system will now be described with reference to FIG. 3. At step 1, the process is started by initializing the system, including synchronizing all of the time base facilities 12 in the CPUs, as described above.

At step 2, time base 12 issues the notification signal to performance monitor 10. The performance monitor then receives the notification from time base 12 and samples of CPU state data is stored in special purpose registers 12, 14, 16 or the like (step 3). Next, at step 4, performance monitor 10 issues an interrupt to branch processing unit 20.

Step 5 determines whether interrupts are enabled by BPU 20, and if not, the process loops back to step 5 and waits until BPU 20 enables (unmasks) interrupts. If, at step 5 it is determined that interrupts are enabled by BPU 20, then an interrupt request is sent by BPU 20 to the operating system interrupt handler 22 (step 6). A performance monitor interrupt service routine is then invoked, at step 7, by interrupt handler 22 which then reads the sampled data from the special purpose registers 12, 14, 16 at step 8. The data read from the SPRs is then stored to memory 30 for post-processing at step 9. Subsequent to step 9, the process continues to step 10 and ends.

It should be noted that post-processing as referred to herein includes placing the data in a graphical format for use by an end user to detect trends in CPU performance, as well as determining if multiple processes are spinning on a lock, such as when more than one process desires access to a single resource. Further, post-processing may include invoking a software process to compile statistics regarding MP system performance, or the like.

Although certain preferred embodiments have been shown and described, it should be understood that many changes and modification may be made therein without departing from the scope of the appended claims.

We claim:

1. A system for providing state information for each CPU in a multiprocessor system, comprising:

means for issuing a notification signal to retrieve said state information at a predetermined point in time, synchronized across each said CPU in the multiprocessor system;

means, in each said CPU, for receiving said notification signal, and for placing said state information in at least one register regardless of whether interrupts are masked or not;

means, in each said CPU for issuing a transfer request signal to transfer said state information from said register to a memory in said multiprocessor system; and an interrupt handling mechanism, in each said CPU, which initiates a substantially immediate transfer of said state information, in response to said transfer request signal, from said register to said memory when interrupt masking is not present, and which defers transfer of said state information, irrespective of said transfer request signal, from said register to said memory when interrupt masking is present;

wherein said state information corresponding to said predetermined point in time is maintained, independent of whether any of said interrupt handling mechanisms are responding to said transfer request signal.

2. A system according to claim 1 wherein said interrupt handling mechanism selectively enables and disables acceptance of interrupt requests.

3. A system according to claim 2 wherein said means for issuing comprises means for counting specific system events to determine when said notification signal is to be issued.

4. A system according to claim 3 wherein said means for receiving comprises at least one special purpose register for storing said state information.

5. A system according to claim 3 further comprising means for synchronizing each said CPU in said multiprocessor system by setting each said means for counting to an identical initial point in time.

6. A system according to claim 5 wherein said means for synchronizing comprises:

means for adjusting said means for counting based upon a clock synchronization protocol implemented by a single said CPU in said multiprocessor system; and means for matching each said means for counting in each said CPU in said multiprocessor system when said multiprocessor system is initialized.

7. A system according to claim 5 wherein said means for synchronizing comprises means for setting each said means for counting in each said CPU to an identical time value by stopping, and then restarting said multiprocessor system.

8. A system according to claim 7 wherein said specific system events comprise a cache miss and a percentage of system bus cycles.

9. A method of providing state information for each CPU in a multiprocessor system, comprising the steps of:

issuing a notification signal to retrieve said state information at a predetermined point in time, synchronized across each said CPU in the multiprocessor system;

receiving said notification signal by each said CPU, and placing said state information in at least one register regardless of whether interrupts are masked or not;

issuing a transfer request signal to transfer said state information from said register to a memory in said multiprocessor system;

in response to said transfer request signal, transferring substantially immediately by an interrupt handling mechanism in each said CPU said state information from said register to said memory when interrupt masking is not present, and deferring transferring by the interrupt handling mechanism in each said CPU said state information from said register to said memory when interrupt masking is present;

wherein said state information, corresponding to said predetermined point in time, is maintained independent of whether any of said interrupt handling mechanisms are responding to said transfer request signal.

10. A method according to claim 9 wherein said step of issuing comprises the step of counting specific system events to determine when said notification signal is to be issued.

11. A method according to claim 10 further comprising the step of synchronizing each said CPU in said multiprocessor system by setting a means for counting in each said CPU to an identical initial point in time.

12. A method according to claim 11 wherein said step of synchronizing comprises the steps of:

adjusting said means for counting based upon a clock synchronization protocol implemented by a single said CPU in said multiprocessor system; and matching each said means for counting in each said CPU in said multiprocessor system when said multiprocessor system is initialized.

13. A method according to claim 12 wherein said step of synchronizing comprises the step of setting each said means for counting in each said CPU to an identical time value by stopping, and then restarting said multiprocessor system.

* * * * *